INVENTOR.
LESLIE SILVERMAN

United States Patent Office 3,306,008
Patented Feb. 28, 1967

3,306,008
CONTINUOUS HIGH EXPANSION FOAM GENERATOR WITH CONTROLLED EXPANSION RATES
Leslie Silverman, Dover, Mass., assignor to the United States of America as represented by the United States Atomic Energy Commission
Filed Aug. 10, 1964, Ser. No. 388,736
4 Claims. (Cl. 55—178)

The present invention relates to a continuous high expansion foam generator and more particularly, to an expansion foam generator with readily controlled expansion rates.

As described in my application, Serial No. 268,840, entitled, "Foam Encapsulation Method and Apparatus of Nuclear Reactor Safety," filed on March 28, 1963, highly expansive foams can be generated in time of emergency to encapsulate halogens and particulates within the housing of a nuclear reactor as a safety measure to reduce or prevent leakage of the radioactive products from the containment should the latter be breached. The apparatus described in the aforementioned patent application for the generation of the foam consists of a stationary screen, a blower with a discharge nozzle, and a source of foaming solution. The solution is discharged through the screen thereby generating the foam. While this apparatus does produce satisfactory high expansion foam, the possibility of becoming plugged or clogged from long periods of disuse in a standby system and other limitations which will become apparent from the discussion below, render the particular apparatus somewhat limited in its application.

The disadvantages of the above-described foaming apparatus are overcome by the present invention which provides additional advantages and benefits not obtainable by the earlier construction. Essentially, this invention, in a preferred configuration, consists of a cylindrical screen which rotates through a pool of foaming solution. Continuous dipping of the screen renders the device self-cleaning because of the continuously wetted surfaces while adjustment of the rotation speed makes it possible to control the bubble size in the resulting foam.

It is thus a first object of this invention to provide apparatus for the generation of high expansion foams.

Another object of this invention is to provide apparatus for producing foams with expansion ratios of up to about a thousand to one.

Still another object of this invention is the provision of apparatus for producing foams of selected bubble size.

A further object is foam producing apparatus which is self-cleaning.

Figure 1:
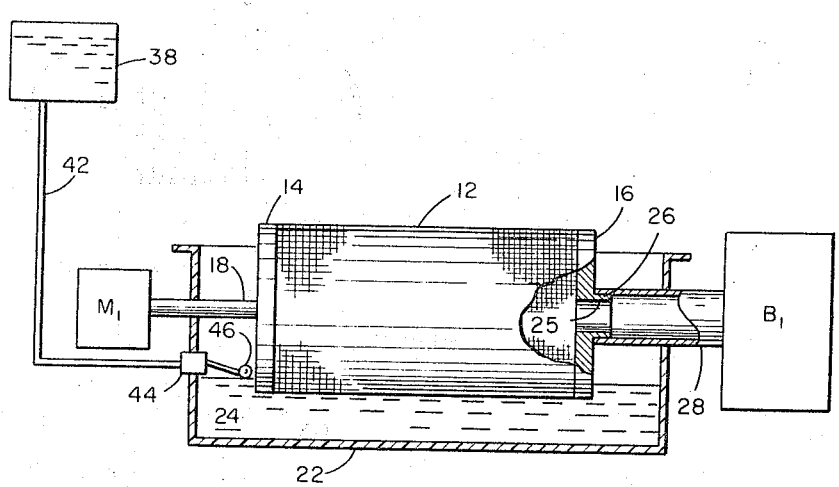
Figure 2:
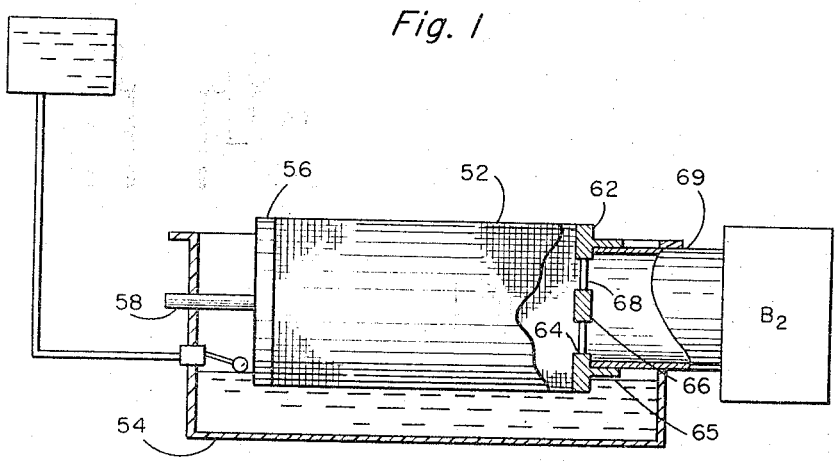
Figure 3:
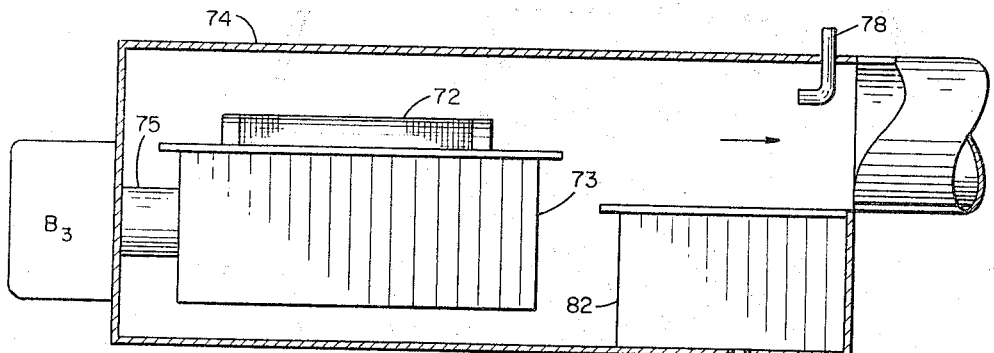

Other objects and advantages of this invention will become obvious from the following description of preferred embodiments of the invention taken with the accompanying drawings in which:

FIG. 1 shows a preferred form of this invention;
FIG. 2 shows an alternate construction; and
FIG. 3 illustrates an application of the invention to the scrubbing of gases.

Referring to FIG. 1, there is shown a preferred embodiment of this invention consisting of a cylindrical screen 12 having end walls 14 and 16. A horizontal shaft 18 supports one end of screen 12 while the opposite end is supported in a manner to be described below. Screen 12 and shaft 18 are mounted for rotation within a pan or open container 22 in which a liquid foaming solution 24 is maintained at a level which covers the lower portion of screen 12. Screen 12 is continuously wetted over its whole surface as it rotates.

Shaft 18 extends through and is supported by the side wall of container 22. Shaft 18 is connected to an electric or compressed air powered motor M1 which provides the power to rotate screen 12. Motor M1 includes the necessary reducing transmission to rotate screen 12 at the desired speed of rotation.

End plate 16 at the other end of screen 12 has an opening 25 and an extension 26. A stationary cylindrical manifold 28 extends through the wall of container 22 terminating at end plate 16, and forming a bearing surface for extension 26 so that screen 12 is free to rotate. A blower B1 supplies air or gas under pressure into manifold 28 and the interior of screen 12. As is understood in the art, blower B1 is driven by a motor (not shown) and the speed of blower B1 (the delivery pressure) would thereby be variable. Any convenient way may be used to maintain the level of foaming solution 24 within pan 22, such as gravity feed arrangement consisting of a reservoir 38, a feed line 42, and a valve 44 controlled by a float 46.

In the operation of the apparatus just described, screen 12 is rotated through the foaming solution forming a film over the mesh openings. Air or gas blown in from blower B1 is supplied at a controlled rate such that the high expansion foam is produced by the gas passing through the openings in screen 12. Blower B1 would be supplied by the air or gasses within the containment which is filled with leaking radioactive products. The solution in addition may contain ingredients which will react with or encapsulate the radioactive gasses and particulates as well as other contaminants.

Bubble size in the foam can be controlled or selected in various ways. The screen openings can be of various mesh sizes, the speed of the screen can be varied, or the delivery pressure of the blower (i.e., its speed) can be varied, or a combination of these factors (such as the ratio of air flow to screen rotation) may be varied. In addition, screen and blower speeds can be varied while in use so that bubble size can be altered without shutting down the apparatus.

Foaming solutions which can be used with this apparatus are as described in my aforementioned application. For example, 1 to 2½% ammonium lauryl ether, sulfate or magnesium lauryl ether sulfate solutions may be used. Various stabilizers such as lauryl alcohol or glycerine may be added to provide foam stability. The apparatus shown in FIG. 1 was constructed and tested and found to produce foams readily as high as 900 to 1 expansion ratios.

It will be seen that the foam generator described produces a high expansion foam which can also be utilized for fire fighting. It eliminates the need for auxiliary fluid pumps since solutions can be fed by gravity feed into the pan with a ball float shut-off valve. In addition, a fireproof, all metal screen surface may be employed as the foam generating surface. Hence drying or plugging will not occur. Because the screen rotates through a liquid solution, it is possible to keep the screen continuously washed and provide a freshly renewed surface during each revolution. The device has the added advantage that on standing, no significant clogging, crystallization or drying out will take place in the foaming mesh material.

An alternate embodiment of this invention is illustrated in FIG. 2 in which the air delivered by the blower provides the power to rotate the screen as well. In this arrangement there is shown a cylindrical screen 52 mounted in container 54 having one end wall 56 supported by a shaft 58. The other end of screen 52 is supported for rotation by an end plate 62 with an enlarged opening 64 and a hub 66, and a plurality of radial turbine blades or vanes 68. Cylindrical manifold 69 supports extension 65 for rotation as in FIG. 1 while blower assembly B2 supplies air under pressure for manifold 69. The air under pressure from blower B2 acts on turbine blades or vanes 68 to rotate screen 52 and then acts as the gas for forming the foam as in the previously described arrangement.

In accordance with this invention, it is also possible to combine the blower into the screen thereby forming a very compact arrangement. In this construction, not shown, the screen and blower together would be driven directly by a motor through some convenient planetary or other gear arrangement.

It should also be pointed out that the invention may be suitably adapted for use as a continuous scrubbing device to clean gases in the manner shown in FIG. 3. There it will be seen that cylindrical screen 72 and pan 73 are mounted within a duct 74. Blower B3 supplies air to be scrubbed through a manifold 75 into screen 72. The foam produced traps or otherwise collects the particulate in the air within duct 74. A suitable spray from a nozzle 78 acts as a defoamer with the resulting liquids being collected in a sump tank 82 which may be emptied through a drain 84. Consequently the foam generator and spray attachment are combined into a simple low pressure gas cleaning device.

It is thus seen that there has been provided a simple and unique arrangement for the generation of high expansion foams useful in reactor safety systems and gas cleaning. While only preferred embodiments of the invention have been described, it is understood that the invention is not to be limited by these examples but is to be defined by the scope of the appended claims.

I claim:
1. High expansion foam generating apparatus comprising:
   (a) means for producing the foam consisting of a hollow cylindrical member having a screen surface;
   (b) a container for said member;
   (c) means mounting said member for rotation at least partially within said container, said container having sufficient foaming liquid to cover a portion of said screen surface which is thus continuously wetted by the liquid in said container during rotation; and
   (d) means for pumping gas under sufficiently high pressure directly into said member, said gas escaping outwardly through said screen surface, to cause said liquid to form foam of about 900 to 1 expansion ratio.
2. The foam generating apparatus of claim 1 in which said member includes means acted upon by said gas under pressure to cause its rotation.
3. High expansion foam generating apparatus comprising:
   (a) means for producing foam consisting of a cylindrical screen;
   (b) a container for said screen;
   (c) means mounting said screen for rotation at least partially within said container, said container having sufficient foaming liquid to cover a portion of said screen;
   (d) means for pumping gas under sufficiently high pressure directly into said screen, said gas escaping outwardly through the openings in said screen to generate foam of about 900 to 1 expansion ratio; and
   (e) means located upstream of said screen for utilizing said gas under pressure to rotate said screen causing the latter to be continuously wetted by the liquid in said container.
4. Gas scrubbing apparatus comprising:
   (a) means for generating foam from contaminated gas to be scrubbed and a liquid foaming solution consisting of a cylindrical screen rotating through a liquid foaming solution to wet continuously the surfaces of said screen, and means located upstream of said screen for pumping the contaminated gas under pressure directly into the interior of said screen; and
   (b) means for defoaming the foam produced to remove the contaminants from the gas along with the liquid foaming solution.

References Cited by the Examiner
UNITED STATES PATENTS

| | | | |
|---|---|---|---|
| 1,844,851 | 2/1932 | Harmon | 55—94 |
| 2,066,913 | 1/1937 | Schmieg | 261—92 |

FOREIGN PATENTS 916,561   8/1946   France.

REUBEN FRIEDMAN, *Primary Examiner.*

R. BURKS, *Assistant Examiner.*